UNITED STATES PATENT OFFICE.

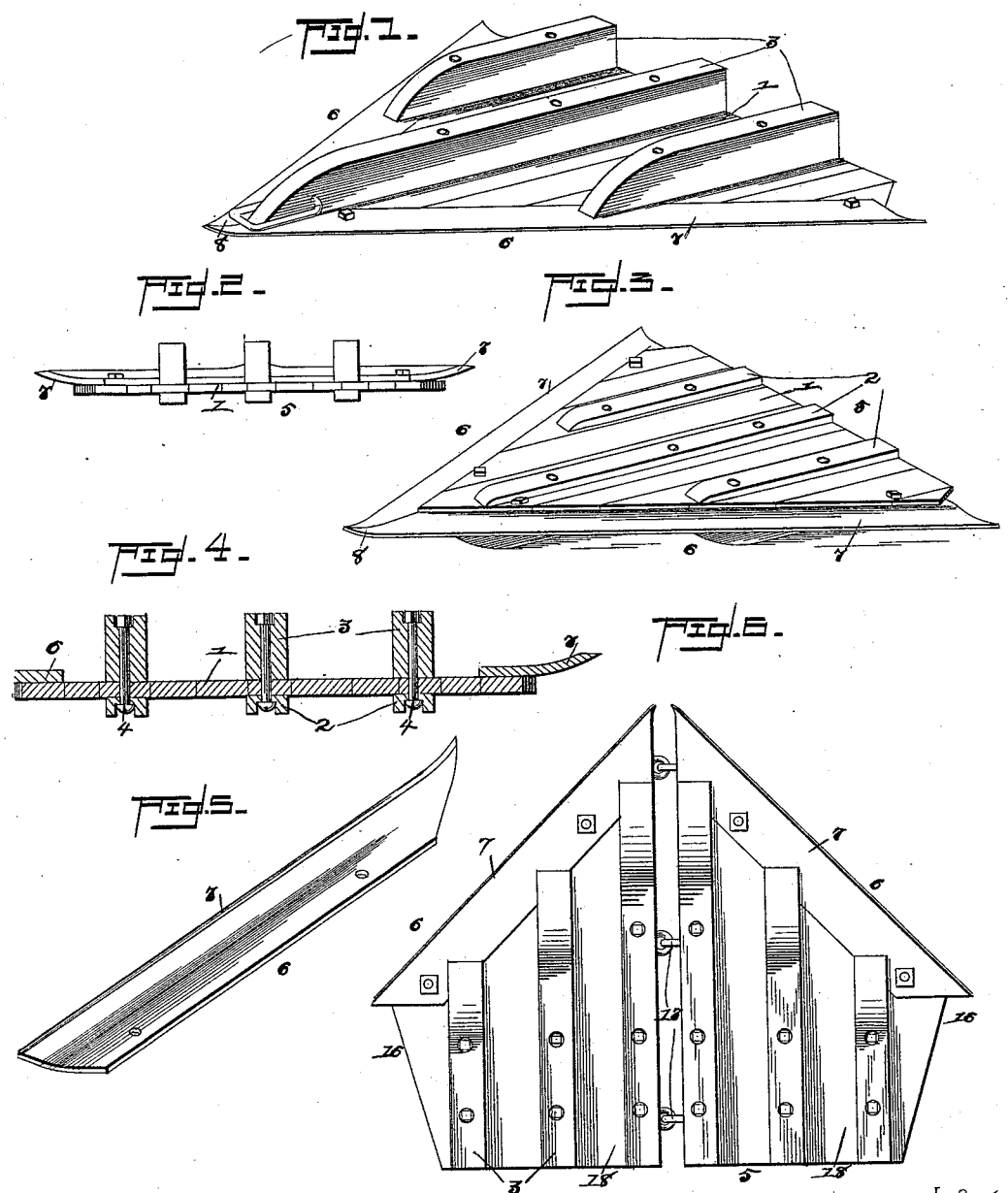

SAMUEL BROOKE, OF MACKSVILLE, KANSAS.

CORN-HARVESTER.

SPECIFICATION forming part of Letters Patent No. 447,296, dated March 3, 1891.

Application filed November 29, 1890. Serial No. 373,014. (No model.)

*To all whom it may concern:*

Be it known that I, SAMUEL BROOKE, a citizen of the United States, residing at Macksville, in the county of Stafford and State of Kansas, have invented a new and useful Device for Cutting Corn, of which the following is a specification.

This invention relates to an improved device or apparatus for cutting corn, sorghum, sunflower-stalks, and the like, and which may be used as a practical sunflower-exterminator; and it has for its object to provide a machine of this class which shall be very simple in construction and which may be readily converted to any of the various uses for which it is adapted.

The invention consists in the improved construction, arrangement, and combination of parts, which will be hereinafter fully described, and particularly pointed out in the claims.

In the drawings hereto annexed, Figure 1 is a perspective view showing my invention arranged for cutting and exterminating sunflowers. Fig. 2 is a rear view of the same. Fig. 3 is a perspective view showing the machine arranged for cutting corn and the like. Fig. 4 is a transverse sectional view of the same. Fig. 5 is a perspective detail view of one of the knives or cutters. Fig. 6 is a detail view showing a modification.

Like numerals of reference indicate like parts in all the figures.

1 designates the body or platform of my improved machine, which is triangular in shape, and which is mounted between runners 2 and 3, of which any desired number may be mounted on each side of the said platform. The runners 2 on one side of said platform are only a few inches in height and are much lower than the runners 3, mounted on the opposite side. The parts are to be connected by means of bolts 4, extending vertically through the runners and platform. The several runners on each side are arranged parallel with each other, and they extend from the base or rear edge 5 of said platform in the direction of the point of the latter.

To the sides of the platform are bolted the forwardly-converging knives or cutters 6 6, which have upwardly-curved outer edges 7 and the front ends of which meet at the point 8. These knives or cutters are bolted detachably to the platform, in order that they may be conveniently reversed when desired.

When in operation it is desired to cut and exterminate sunflowers, the machine is arranged as shown in Figs. 1 and 2—that is, the platform is supported upon the low runners 2 and the runners 3 are mounted on what is then the upper side of the platform. Draft is attached to the front end of the central runners, and the machine is dragged over the field, the operators—two in number—being meanwhile stationed upon the upper side of the platform, with the double purpose of weighting the latter and seizing the stalks as they are being cut and piling them at the sides of the machine. The upturned cutting-edges of the knives will have a tendency to force the machine in a downward direction, thus making the cut very close to the ground.

When the machine is to be used for cutting corn, sorghum, and the like, it is reversed, so as to rest upon the runners 3. The knives 6 are also removed from the machine and exchanged from side to side, so that their cutting-edges, when the knives are placed in position, shall still be curved in an upward direction. The operation is then proceeded with as before described, the difference being that the cut is not made quite so close to the ground.

The runners of the machine may be made of iron or of wood shod with iron, or of any other suitable material. In the construction of the platform either wood or metal may be employed.

In Fig. 6 of the drawings I have illustrated a modification of my invention, which consists in making the platform in two separate parts or sections, such as 16 16, adapted to be connected by hinge-joints 17. The parts or sections 16 are each provided with a knife or cutter, such as 6, and they may be used separately or independently for the purpose of cutting one or two rows at a time, as may be desired. Each of the parts or sections 16 is provided with runners on opposite sides in the same manner and for the same purpose as the device made in a single piece, as hereinbefore described.

The machine which is made of the hinged sections 16 is not necessarily triangular in shape, but might, as shown in the drawings hereto annexed, be provided with rearwardly-extending wings 18.

My improved cutting apparatus, as will be seen from the foregoing description, is exceedingly simple in construction, and may be manufactured, as well as operated, at a moderate expense.

Having thus described my invention, I claim and desire to secure by Letters Patent of the United States—

1. A machine for cutting corn, sunflowers, and the like, comprising a platform having forwardly-converging knives or cutters and provided on opposite sides with runners of unequal height, substantially as set forth.

2. In a machine of the class described, the combination, with a reversible platform provided on opposite sides with runners of unequal height, of the detachable and interchangeable knives or cutters having curved outer edges, substantially as and for the purpose set forth.

3. In a machine of the class described, the combination of a reversible triangular platform, the runners of unequal height mounted on opposite sides of said platform parallel to each other and extending from the rear edge in the direction of the point of said platform, and the knives or cutters secured at the sides of the latter, substantially as and for the purpose set forth.

4. In a machine of the class described, the combination of the reversible platform, the runners on opposite sides of the latter, the connecting-bolts extending vertically through the platform and through the runners on opposite sides thereof, and the forwardly-converging knives or cutters at the sides of said platform, substantially as and for the purpose set forth.

5. In a machine of the class described, the combination of the reversible triangular platform, the runners of unequal height, secured on opposite sides of said platform parallel to each other and extending from the rear edge in the direction of the point of the platform, and the knives or cutters having upwardly-curved outer edges and meeting in a point at their front ends, said knives or cutters being mounted detachably and interchangeably at the sides of the platform, substantially as and for the purpose set forth.

6. In a machine of the class described, a reversible platform composed of parts or sections hinged together and having forwardly-converging front sides provided with detachable and interchangeable knives or cutters, said parts or sections being each provided on opposite sides with runners of unequal height, substantially as and for the purpose herein set forth.

In testimony that I claim the foregoing as my own I have hereto affixed my signature in presence of two witnesses.

SAMUEL BROOKE.

Witnesses:
D. H. FRINK,
WM. CAIN.